United States Patent [19]
Ritzmann

[11] 3,881,861
[45] May 6, 1975

[54] APPARATUS FOR THE MANUFACTURING OF CEMENT

[75] Inventor: Horst Ritzmann, Neubeckum, Germany

[73] Assignee: Polysius AG, Neubeckum, Germany

[22] Filed: Aug. 14, 1973

[21] Appl. No.: 388,196

[30] Foreign Application Priority Data
Sept. 26, 1972 Germany.............................. 2247172

[52] U.S. Cl.................... 432/106; 34/57 R; 432/14; 432/58; 432/106
[51] Int. Cl............................................. F27b 7/02
[58] Field of Search ........ 432/14, 58, 106; 34/57 R, 34/57 A

[56] References Cited
UNITED STATES PATENTS
| | | | |
|---|---|---|---|
| 3,452,968 | 7/1969 | Shimizu et al. | 34/57 R |
| 3,653,644 | 4/1972 | Polysius et al. | 34/57 R |

*Primary Examiner*—John J. Camby
*Attorney, Agent, or Firm*—Learman & McCulloch

[57] ABSTRACT

Cement raw material is heated in a preheater and then discharged along a path leading to a neutralizing furnace. A portion of the preheated material is diverted from the furnace to an idling chamber in which the diverted material is circulated and further heated and partly neutralized. Material in the idling chamber is discharged to the preheater.

7 Claims, 1 Drawing Figure

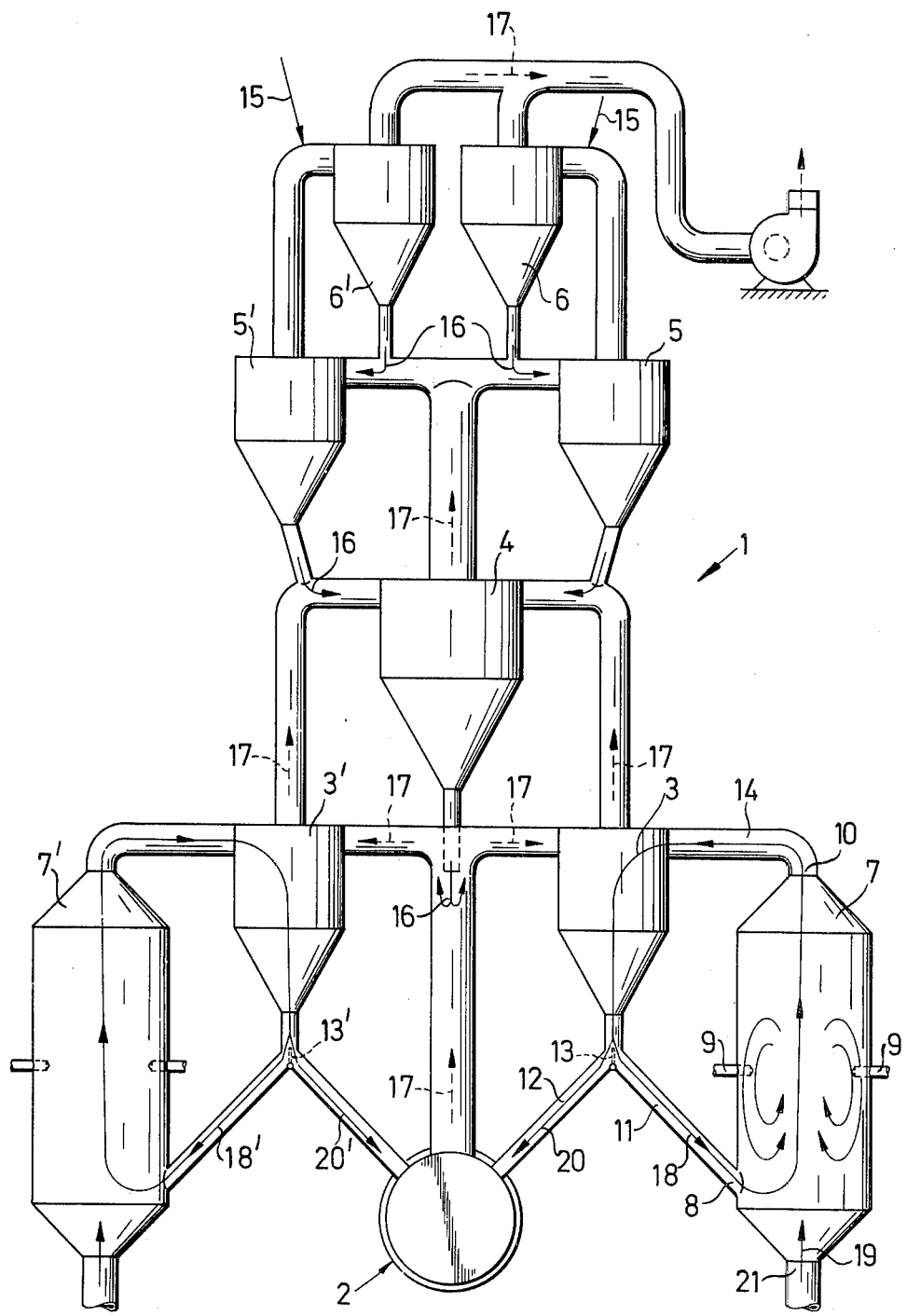

APPARATUS FOR THE MANUFACTURING OF CEMENT

This invention relates to an apparatus and method for the manufacture of cement, lime alumina and like materials, with a preheater for the fine-grained raw material and a rotary tube furnace for the final firing of the preheated and partly neutralized raw material.

In the manufacture of cement the fine-grained, or more accurately, floury raw material is first heated in a preheater which usually consists of a group of cyclones or centrifugal chambers. The raw material is thereby heated to about 800°C and reaches a degree of neutralization of 20–45 percent.

The preheated and partly neutralized raw material must then be finally fired into clinker in a rotary tube furnace, during which it reaches an end temperature of about 1450°C and a 100 percent degree of neutralization. The heat requirement in the rotary tube furnace increases with the amount of neutralization needed in the furnace. With the greater heat requirement the size of the rotary tube furnace also increases correspondingly.

The specific plant costs for a preheater (especially a cyclone preheater, which has no rotary members) are smaller than those of a rotary tube furnace. In order to lower the plant costs, it is thus desirable to perform the maximum possible proportion of the neutralization procedure for the raw-material while it is still in the preheater.

The invention is therefore based on the problem of constructing an apparatus of the type described in such manner that the above specified condition is met.

According to the invention, this problem is solved by providing an idling zone wherein at least part of the preheated raw material is kept circulating in a stream of hot gas for a predetermined time before entering the rotary tube furnace.

Since the neutralization process is dependent not only on temperatures but also on time, the material entering the rotary tube furnace can reach a very high degree of neutralization by means of such an idling zone and with no appreciable temperature increase in the preheated raw material. Through the resultant reduced heat consumption in the rotary tube furnace, there is produced a considerable reduction of the size of the rotary tube furnace, and hence a considerable drop in plant cost.

The apparatus in accordance with the invention is preferably operated with the amount of preheated raw material fed to the idling zone large enough and hence the degree of neutralization in the total raw material fed into the tube furnace high enough for troublesome accumulations in the apparatus to be effectively avoided. Not all raw material can in practice be completely neutralized before entering the rotary tube furnace, since in that case they would become sticky and tend to accumulate in the preheater or the idling zone. However, the treatment of an adjustable fraction of the preheated raw material in the idling zone makes it possible for the neutralization of the raw material before entering the rotary furnace to be taken to a point whereat efficient operation of the plant is still possible.

One embodiment of the invention is shown in the accompanying drawing which is an elevational view of apparatus constructed according to the invention.

The apparatus may be used, for example, in making cement and has as its main features a preheater 1 and a rotary tube furnace 2. The preheater 1 includes two lower cyclones 3, 3' arranged in parallel, a central cyclone 4, two further cyclones 5, 5' arranged in parallel and two upper parallel cyclones 6, 6'. These cyclones are connected together by gas conduits and material outlet pipes in the known manner shown in the drawings.

In accordance with the invention each of the two lower cyclones 3, 3' is associated with an upright housing forming an idling chamber 7, 7', in communication with the lower area of each of which is a gas inlet 21 and an inlet 8 for preheated raw material. In the lower or central area of each chamber are burners 9. At the upper area of each chamber is a common outlet 10 for gas and raw material.

A conduit 11 feeding raw material to the idling chamber 7 branches off from the material outlet conduit 12 of the lowermost cyclone 3. An adjustment member, eg., a valve 13, is disposed in the area of this branching. With this valve the amount of preheated raw material fed into the idling chamber before entering the rotary tube furnace 2 can be varied. A conduit 14 for removing the raw material in the gas stream from the idling chamber 7 terminates in the lowermost cyclone 3.

The mode of operation of the apparatus should be readily understandable. The raw material fed in at 15 (arrows 16) passes in sequence through the cyclones 6, 6'; 5, 5' 4 and 3, 3', in counter-flow to the hot gases (arrows 17).

A specific portion, which is determined by the setting of the valves 13, 13', of the raw material extracted from the cyclones 3, 3' is fed to the idling chambers 7, 7' (arrows 18, 18'). This raw material is upwardly conveyed by the gas flowing into the idling chambers 7 at 21 (arrow 19) which may be exhaust air from the cooler, with the gas stream being heated by the burner 9. Eddy currents can arise in the idling chamber 6, and these are further strengthened by suitable inserts and by suitable feeds of gas and solid material. There is also a circulation through the cyclones 3, 3', which like the intensive heat exchange in the idling chamber 7, 7' leads to extensive neutralization of the raw material.

The material reaching the rotary tube furnace 2 (arrows 20, 20') consequently exhibits a high degree of neutralization. This can be set by the valves 13, 13' to the optimum valve for the particular raw material being used.

What is claimed is:

1. Apparatus for the manufacture of cement, lime, alumina and the like from raw material, said apparatus comprising preheater means; means for delivering raw material to said preheater means; a furnace; means for discharging raw material from said preheater means to said furnace; means establishing a heated idling zone; means for diverting from said furnace to said idling zone a portion of raw material discharged from said preheater means; and means connecting said idling zone to said preheater means for returning to the latter raw material diverted to said idling zone.

2. Apparatus according to claim 1 wherein the means establishing an idling zone comprises an upright housing having inlets for gas and preheated raw material, respectively, and a common outlet for gas and raw material.

3. Apparatus according to claim 2 wherein said inlets are at the lower part of said housing and said outlet is at the upper part of said housing.

4. Apparatus according to claim 1 including adjustable control means for said diverting means for varying the amount of raw material circulated through said idling zone.

5. Apparatus according to claim 1 wherein said preheater means comprises a plurality of cyclones, and wherein said second conduit means establishes communication between said idling zone and a selected number of said cyclones for delivering raw material from said idling zone to the selected cyclones.

6. Apparatus according to claim 1 wherein said preheater means comprises at least two lower cyclones arranged in parallel, a central cyclone, two further cyclones arranged in parallel above said lower cyclones, and two uppermost cyclones, and wherein one of said idling zones is associated with each of said lower cyclones.

7. Apparatus for the manufacture of cement, lime, alumina and the like from raw material, said apparatus comprising a plurality of preheater cyclones arranged in superposed interconnected relation; a furnace; means for directing exhaust gases from said furnace through said preheater cyclones; an additional heating chamber; means for combusting fuel in said chamber; first means for discharging raw material from the lowermost preheater cyclone to said furnace; second means for discharging raw material from said lowermost cyclone to said chamber; adjustable control means for regulating the discharge of raw material from said lowermost cyclone to the respective first and second means: and conduit means connecting said chamber to said lowermost cyclone for returning raw material thereto from said chamber.

* * * * *